(12) United States Patent
Kometani et al.

(10) Patent No.: US 11,996,734 B2
(45) Date of Patent: May 28, 2024

(54) STATOR AND ROTARY ELECTRIC MACHINE USING SAME

(71) Applicant: Mitsubishi Electric Corporation, Tokyo (JP)

(72) Inventors: Haruyuki Kometani, Tokyo (JP); Ryoji Miyatake, Tokyo (JP); Takuro Yamada, Tokyo (JP); Kenji Tanaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 238 days.

(21) Appl. No.: 17/779,558

(22) PCT Filed: Jan. 21, 2020

(86) PCT No.: PCT/JP2020/001815
§ 371 (c)(1),
(2) Date: May 25, 2022

(87) PCT Pub. No.: WO2021/149130
PCT Pub. Date: Jul. 29, 2021

(65) Prior Publication Data
US 2023/0007990 A1      Jan. 12, 2023

(51) Int. Cl.
*H02K 1/17*   (2006.01)
*H02K 1/20*   (2006.01)
(Continued)

(52) U.S. Cl.
CPC .................. *H02K 1/17* (2013.01); *H02K 1/20* (2013.01); *H02K 9/19* (2013.01); *H02K 21/24* (2013.01)

(58) Field of Classification Search
CPC .. H02K 1/17; H02K 1/20; H02K 9/19; H02K 21/24; H02K 1/165; H02K 21/44; H02K 49/102; H02K 1/16; H02K 1/12
See application file for complete search history.

(56) References Cited

U.S. PATENT DOCUMENTS

| 4,739,202 A | 4/1988 | Hatanaka et al. |
| 4,758,756 A * | 7/1988 | Pouillange ............. H02K 19/18 310/152 |

(Continued)

FOREIGN PATENT DOCUMENTS

| EP | 2369719 A2 | 9/2011 |
| JP | 62-213559 A | 9/1987 |

(Continued)

OTHER PUBLICATIONS

International Search Report and Written Opinion mailed on Apr. 7, 2020, received for PCT Application PCT JP2020/001815, Filed on Jan. 21, 2020, 11 pages including English Translation.

(Continued)

*Primary Examiner* — Thomas Truong
(74) *Attorney, Agent, or Firm* — XSENSUS LLP

(57) ABSTRACT

A stator includes: a stator core including a plurality of stator teeth in a circumferential direction with respect to a center of rotation of a rotary electric machine; a stator coil disposed on a bottom portion side of each of a plurality of stator slots formed between the stator teeth; and a stator magnet disposed on an opening side of each of the plurality of stator slots and having the same polarity in a radial direction, and in each of the stator slots, the stator magnet is divided at a center in the circumferential direction of the stator slot.

8 Claims, 21 Drawing Sheets

(51) Int. Cl.
*H02K 9/19* (2006.01)
*H02K 21/24* (2006.01)

(56) References Cited

U.S. PATENT DOCUMENTS

| | | |
|---|---|---|
| 10,014,738 B2 * | 7/2018 | Tojima .................. H02K 49/102 |
| 2005/0179337 A1 | 8/2005 | Hasebe et al. |
| 2006/0284507 A1 | 12/2006 | Murakami |
| 2011/0234038 A1 | 9/2011 | Kobayashi et al. |
| 2015/0075886 A1 | 3/2015 | Tonari et al. |
| 2015/0171676 A1 | 6/2015 | Kobayashi et al. |
| 2015/0318743 A1 | 11/2015 | Baba et al. |

FOREIGN PATENT DOCUMENTS

| | | |
|---|---|---|
| JP | 2005-143276 A | 6/2005 |
| JP | 2006-353009 A | 12/2006 |
| JP | 2015-61423 A | 3/2015 |
| JP | 2015-89224 A | 5/2015 |
| JP | 2016-135014 A | 7/2016 |
| JP | 2019-161738 A | 9/2019 |
| WO | 2014/046228 A1 | 3/2014 |
| WO | 2018/043026 A1 | 3/2018 |

OTHER PUBLICATIONS

Extended European search report issued on Dec. 20, 2022, in corresponding European patent Application No. 20914788.3, 10 pages.

* cited by examiner

STATOR AND ROTARY ELECTRIC MACHINE USING SAME

CROSS-REFERENCE TO RELATED APPLICATION

The present application is based on PCT filing PCT/JP2020/001815 filed Jan. 21, 2020, the entire contents of which is incorporated herein by reference.

TECHNICAL FIELD

The present disclosure relates to a stator and a rotary electric machine using the same.

BACKGROUND ART

Conventionally, a mechanical transmission in which a rotary electric machine is connected to a rotary shaft provided at the center of rotation and which reduces the rotation of the rotary electric machine has been used for applications that require low-speed drive. In the case where a mechanical transmission is used, mechanical wear or the like occurs in the transmission, so that regular maintenance is required. On the other hand, a rotary electric machine that can change the rotation speed of a rotor in a non-contact manner is disclosed as a magnetic wave gear device or a magnetic geared generator (see, for example, Patent Document 1).

The magnetic wave gear device disclosed in Patent Document 1 includes a stator, a first rotor which rotates at a low speed, and a second rotor which rotates at a high speed in accordance with a gear ratio, in order from the outer circumferential side with a rotary shaft as a center. The stator has a stator coil which can output generated power or allows generated torque to be controlled. When the rotary electric machine is used, the rotation speed of the rotor can be changed in a non-contact manner, so that maintenance due to mechanical wear or the like is unnecessary, and the burden of maintenance can be reduced. In addition, when the rotary electric machine is used as a generator, speed change and power generation are possible with one rotary electric machine without a mechanical transmission, the size of a power generation system is reduced, and space saving can be achieved.

CITATION LIST

Patent Document

Patent Document 1: Japanese Laid-Open Patent Publication No. 2016-135014

SUMMARY OF THE INVENTION

Problems to be Solved by the Invention

In the structure of the rotary electric machine in Patent Document 1, the stator has a stator core having a plurality of stator slots, and both a stator coil and a stator magnet are stored in each stator slot, so that both speed change and power generation can be performed with one rotary electric machine. In addition, a chip portion which is a magnetic body is provided as a back yoke at a part on the stator coil side of the stator magnet so as to project from a wall surface of the stator slot, so that output increase is achieved. However, for example, when a rare earth sintered magnet is used as the stator magnet, if a magnetic flux generated from the rotor interlinks with the stator magnet, an eddy current is generated on the surface, of the stator magnet, on the side opposed to the rotor. Eddy current loss caused by this eddy current occurs in the stator magnet, thus causing a problem that the performance of the stator deteriorates and the efficiency of the rotary electric machine deteriorates.

Moreover, when an eddy current is generated in the stator magnet, Joule heat is generated in the stator magnet by the eddy current. At that time, the temperature of the stator magnet rises. Thus, when the temperature rises, although there is a difference depending on the type of a permanent magnet used as the stator magnet, if the temperature of the permanent magnet exceeds the permissible temperature, the permanent magnet is thermally demagnetized, thus causing a problem that the performance of the stator deteriorates due to the decrease in the magnetic force of the permanent magnet, and the reliability of the rotary electric machine is impaired.

The present disclosure has been made to solve the above problems, and an object of the present disclosure is to obtain a stator that suppresses eddy current loss that occurs in each stator magnet.

Solution to the Problems

A stator according to the present disclosure is a stator including: a stator core including a plurality of stator teeth in a circumferential direction with respect to a center of rotation of a rotary electric machine; a stator coil disposed on a bottom portion side of each of a plurality of stator slots formed between the stator teeth; and a stator magnet disposed on an opening side of each of the plurality of stator slots and having the same polarity in a radial direction, wherein, in each of the stator slots, the stator magnet is divided at a center in the circumferential direction of the stator slot along the polarity, and the stator includes magnetic chip portions provided on opposed two wall surfaces of the stator slot between the stator coil and the stator magnet so as to be spaced apart from each other and be each in contact with the stator magnet.

Effect of the Invention

In the stator according to the present disclosure, it is possible to suppress eddy current loss in each stator magnet.

DESCRIPTION OF EMBODIMENTS

Figure 1:
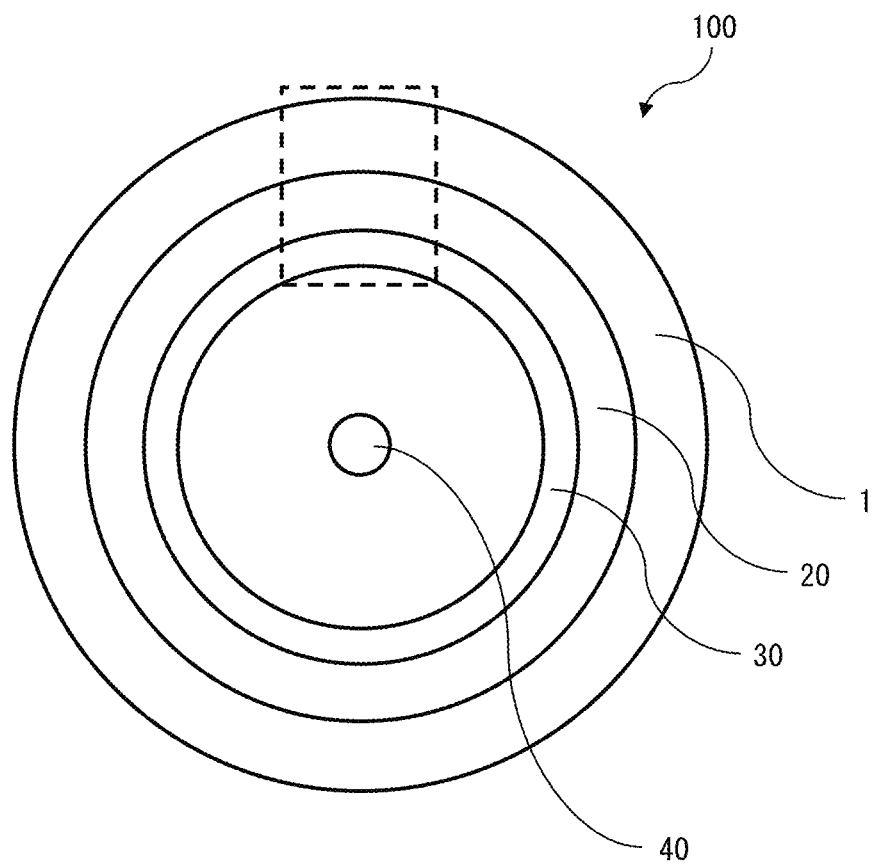
FIG. 1 is a schematic diagram showing a cross-section of a rotary electric machine according to Embodiment 1.

Hereinafter, stators according to embodiments of the present disclosure and rotary electric machines using the same will be described with reference to the drawings. In the drawings, the same or corresponding members and parts are denoted by the same reference characters to give description.

Embodiment 1

Figure 2:
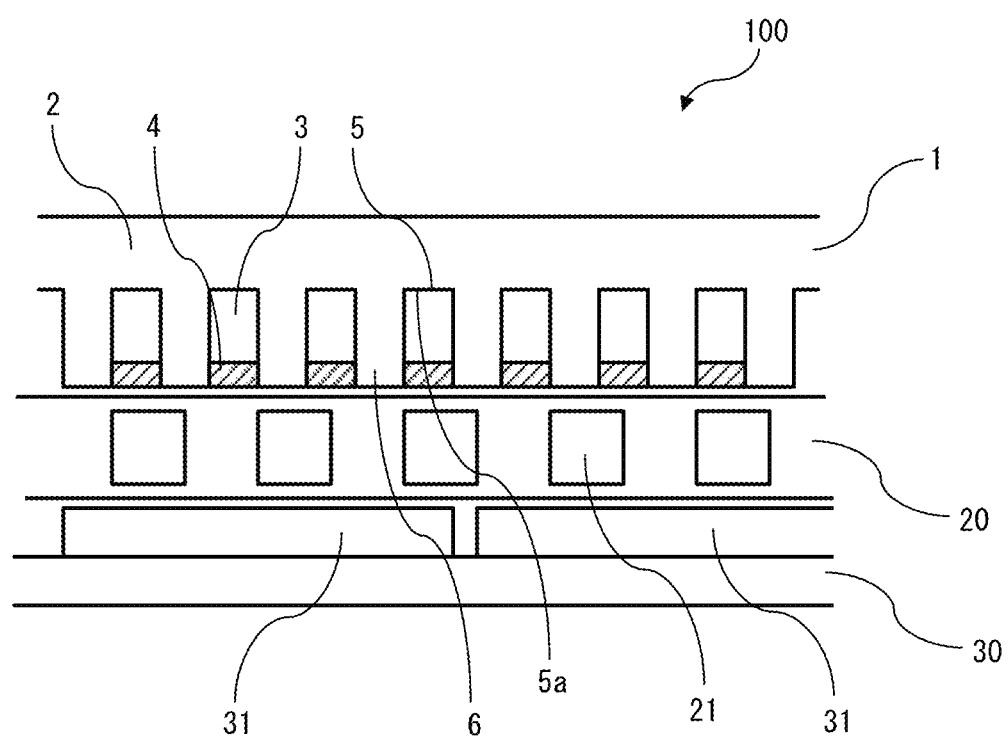
FIG. 2 is a schematic diagram showing a major part of the rotary electric machine according to Embodiment 1.

FIG. 1 is a schematic diagram showing a cross-section of a rotary electric machine 100, and FIG. 2 is a schematic diagram showing a major part of the rotary electric machine 100. FIG. 2 is an enlarged view of a portion surrounded by a broken line in FIG. 1. As shown in FIG. 1, the rotary electric machine 100 includes: an annular stator 1 which surrounds a rotary shaft 40 which is at the center of rotation of the rotary electric machine 100; a low-speed rotor 20 which is a first rotor provided coaxially with the stator 1; and a high-speed rotor 30 which is a second rotor provided coaxially with the low-speed rotor 20 so as to be opposed to the low-speed rotor 20. First, a general structure and operation of a magnetic geared generator as the rotary electric machine 100 will be described.

As shown in FIG. 2, the stator 1 includes a stator core 2, a stator coil 3, and stator magnets 4. The annular stator core 2 includes a plurality of stator teeth 6 provided at equal intervals in the circumferential direction with respect to the center of rotation of the rotary electric machine 100. A plurality of stator slots 5 formed between the stator teeth 6 each include the stator coil 3 and the stator magnet 4. The stator coil 3 is disposed on a bottom portion 5a side of the stator slot 5. The stator magnet 4 is disposed on the opening side of the stator slot 5. The stator magnets 4 are all magnetized in the same direction in the radial direction. Each stator magnet 4 is, for example, a neodymium sintered magnet, but is not limited thereto. When the radially inner side of the stator magnet 4 is an N pole, the radially inner side of each stator tooth 6 adjacent thereto is an S pole, and pole pairs, the number Ns of which is equal to the number of stator slots 5, are formed.

The low-speed rotor 20 is provided on the inner circumferential side of the stator 1 so as to be opposed to the stator magnets 4 across a minute gap. The low-speed rotor 20 has a plurality of magnetic pole pieces 21 arranged at equal intervals in the circumferential direction, and rotates at a low speed by external power. The number of magnetic pole pieces 21 is denoted by NL. The high-speed rotor 30 is provided on the inner circumferential side of the low-speed rotor 20. The high-speed rotor 30 has high-speed rotor magnets 31 which are a plurality of permanent magnets and provided on an outer circumferential portion thereof at equal intervals, and pole pairs, the number of which is Nh, are formed.

If the relationship between Ns, NL, and Nh satisfies NL=Ns±Nh, a negative torque is generated in the low-speed rotor 20 due to the interaction between the magnetic forces of the stator magnets 4 and the high-speed rotor magnets 31. On the other hand, by rotating the low-speed rotor 20 by external power, an input can be obtained at the low-speed rotor 20. If a stator current is applied to the stator coil 3 such that the high-speed rotor 30 freely runs with respect to the input of the low-speed rotor 20, the high-speed rotor 30 rotates at a rotation speed that is NL/Nh times that of the low-speed rotor 20. When the high-speed rotor 30 rotates at a speed that is NL/Nh times that of the low-speed rotor 20, an induced electromotive force is generated in the stator coil 3. Due to the generation of the induced electromotive force, generated power is outputted from the stator coil 3.

Figure 3:
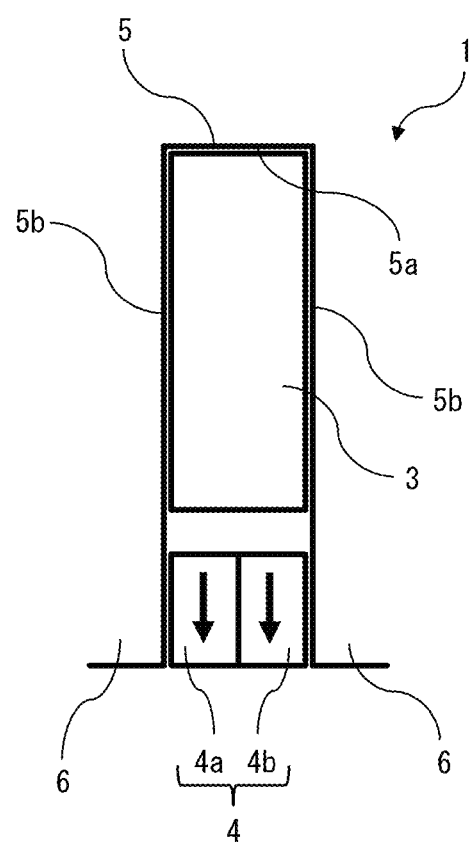
FIG. 3 is a schematic diagram showing a cross-section of a stator slot of the rotary electric machine according to Embodiment 1.

The internal configuration of the stator slot 5 which is a major part of the present disclosure will be described. FIG. 3 is a schematic diagram showing a cross-section of the stator slot 5 of the rotary electric machine 100 according to Embodiment 1. Each stator slot 5 includes the stator coil 3 and the stator magnet 4. The stator coil 3 and the stator magnet 4 are provided so as to be opposed to each other. Each stator magnet 4 is magnetized so as to have the same polarity in the radial direction. For example, the direction of arrows shown in FIG. 3 is the magnetization direction. The stator magnet 4 is divided into a stator magnet 4a and a stator magnet 4b at the center in the circumferential direction of the stator slot 5. The stator coil 3 and the stator magnet 4 are fixed, for example, so as to be adhered to wall surfaces 5b of the stator slot 5, but the fixing method therefor is not limited thereto. The stator magnet 4a and the stator magnet 4b may be disposed such that the divided portions thereof are in contact with each other.

Figure 4:
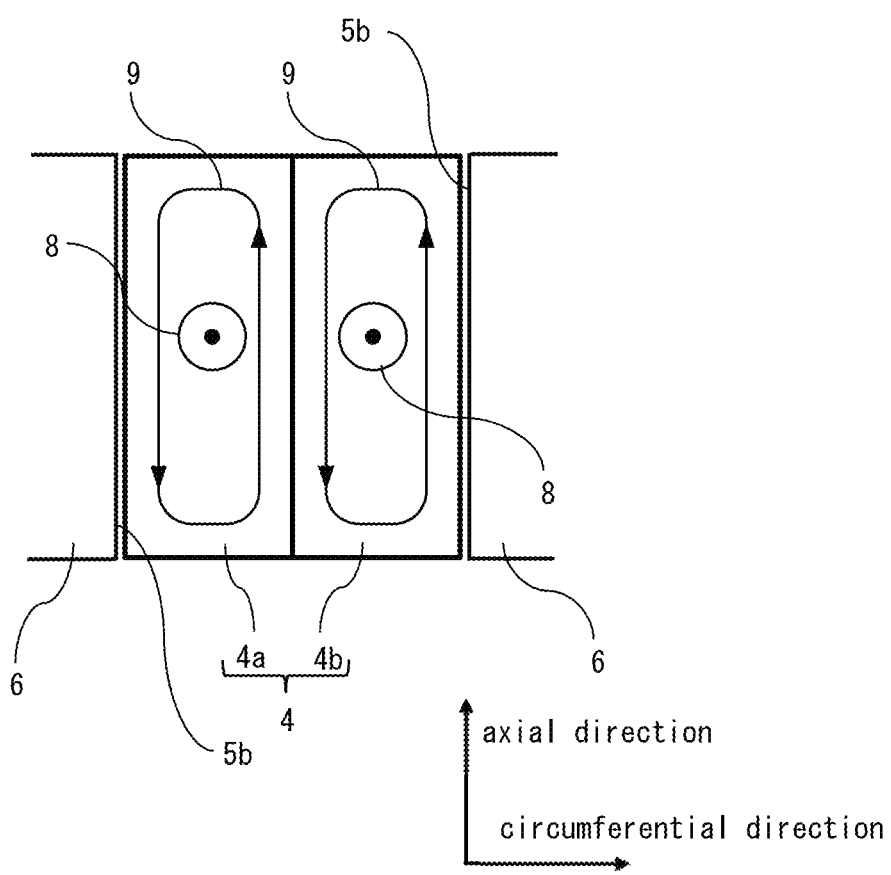
FIG. 4 is a diagram illustrating an eddy current generated in a stator magnet that is divided.
Figure 5:
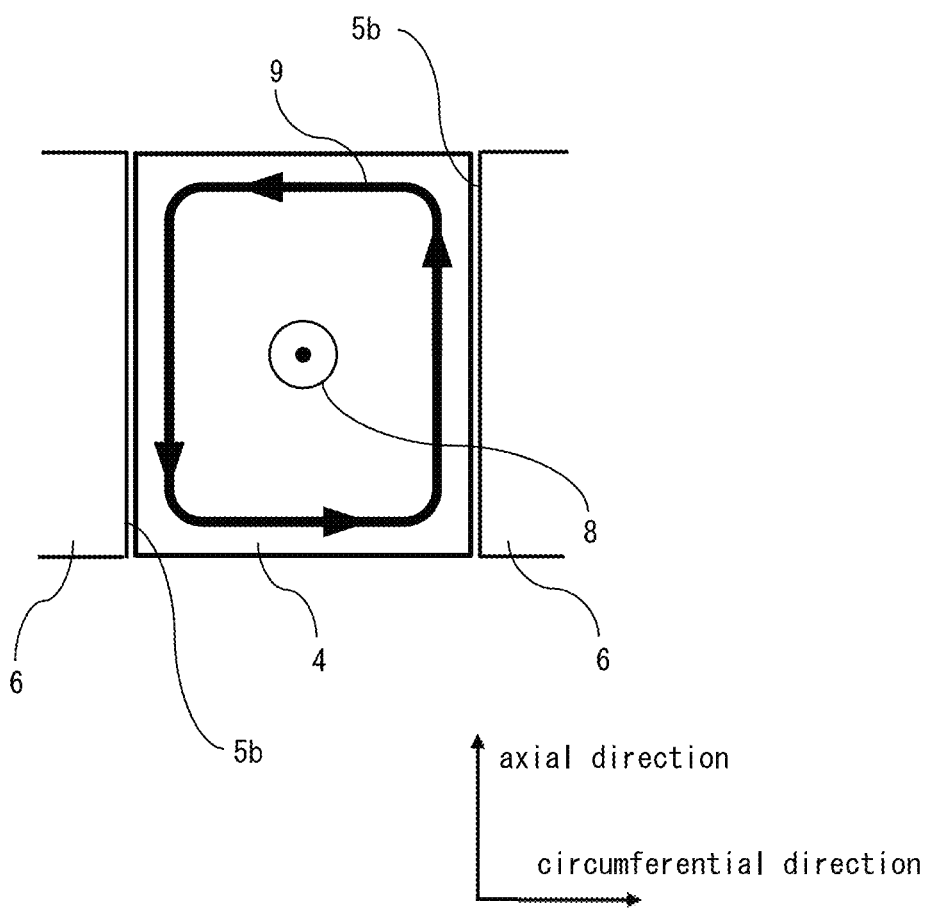
FIG. 5 is a diagram illustrating an eddy current generated in a stator magnet that is not divided.

The reason why the stator magnet 4 is provided in a divided manner will be described. A magnetic flux generated from the low-speed rotor 20 and the high-speed rotor 30 interlinks with the stator magnet 4. Therefore, when a rare earth sintered magnet or the like having a high conductivity is used as the stator magnet 4, an eddy current is generated in the stator magnet 4. FIG. 4 and FIG. 5 are each a diagram illustrating an eddy current generated in a stator magnet 4.

FIG. 4 and FIG. 5 are each a view of a stator magnet 4 as seen from the low-speed rotor 20 side, FIG. 4 shows a stator magnet 4 that is divided, and FIG. 5 shows a stator magnet 4 that is not divided. In each of the drawings, a magnetic flux 8 perpendicular to the drawing sheet and extending from the back to the front of the drawing sheet interlinks, and an eddy current 9 is generated in a direction indicated by an arrow. In FIG. 5, since the stator magnet 4 is not divided, an eddy current 9 whose flow path is not cut is generated. In FIG. 4, since the stator magnet 4 is divided, the flow path of the eddy current 9 is cut, and the eddy current 9 is reduced as compared to that in FIG. 5. As a result of dividing the stator magnet 4, the eddy current 9 can be reduced, and eddy current loss is suppressed, so that the performance of the stator is not deteriorated and deterioration of the efficiency of the rotary electric machine can be suppressed. In addition, Joule heat due to an eddy current is also suppressed, so that the performance of the stator does not deteriorate and the reliability of the rotary electric machine is improved. In FIG. 4 and FIG. 5, the stator magnet 4 and the stator teeth 6 adjacent thereto are shown with the same axial dimension, but the axial dimensions of the stator magnet 4 and the stator teeth 6 are not limited thereto and may be different.

Figure 6:
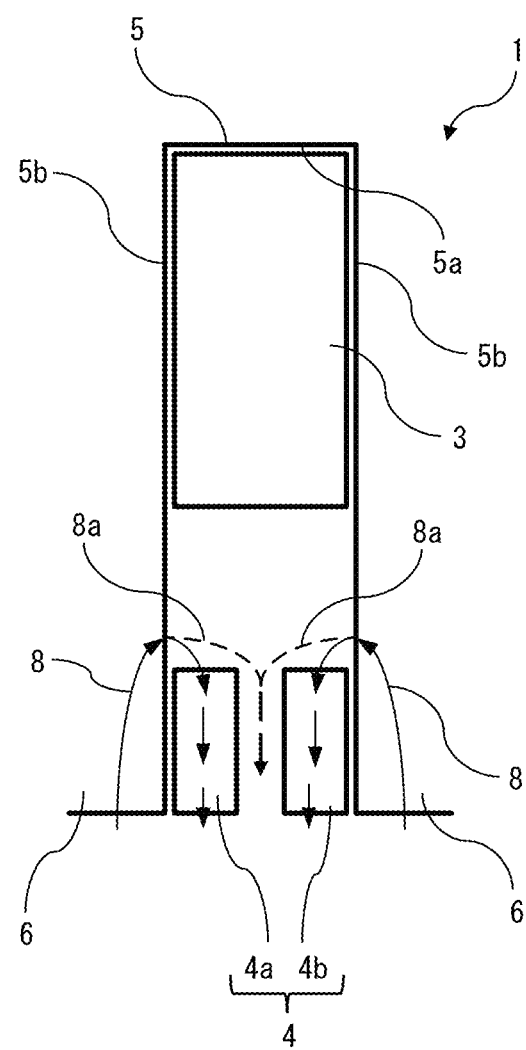
FIG. 6 is a schematic diagram illustrating a magnetic flux around the stator magnet of the rotary electric machine according to Embodiment 1.

FIG. 6 is a schematic diagram illustrating a magnetic flux 8 around the stator magnet 4 of the rotary electric machine 100 according to Embodiment 1. FIG. 6 is a diagram in which the magnetic flux 8 caused by the stator magnet 4 is added to FIG. 3. In FIG. 6, in order to show the state of the magnetic flux, the stator magnet 4a and the stator magnet 4b are shown so as to be spaced apart from each other. When the stator magnet 4 is divided, a magnetic flux is not generated from the location where the stator magnet 4 is divided, so that it is considered that the magnetic force of the stator magnet 4 is reduced as compared to that in the case where the stator magnet 4 is not divided. However, a magnetic flux 8a extending from each stator tooth 6 toward the center in the circumferential direction of the stator slot 5 has a long distance from the stator tooth 6 to the center, and thus is a magnetic flux from which it is most difficult to obtain a magnetic force. That is, even if the stator magnet 4 is not divided, the magnetic flux 8a generated from the stator magnet 4 at the center of the stator slot 5 is smaller than a magnetic flux generated at a place other than the center. Therefore, if the stator magnet 4 is divided at the center in the circumferential direction of the stator slot 5, a decrease in the magnetic force of the stator magnet 4 due to the division is suppressed as much as possible.

As described above, in the stator 1 according to Embodiment 1, since each stator magnet 4 is divided at the center in the circumferential direction of the stator slot 5, the eddy current 9 is reduced, so that the eddy current loss in the stator magnet 4 can be suppressed. In addition, since each stator magnet 4 is divided at the center in the circumferential direction, a decrease in the magnetic force of the stator magnet 4 due to the division can be suppressed. Moreover, since the eddy current 9 is reduced, thermal demagnetization of the stator magnet 4 can be suppressed. Moreover, since the eddy current loss and thermal demagnetization of the stator magnet 4 are suppressed, the deterioration of the performance of the stator 1 can be suppressed, the output of the rotary electric machine 100 is maintained, and the reliability of the rotary electric machine 100 can be improved.

Embodiment 2

Figure 7:
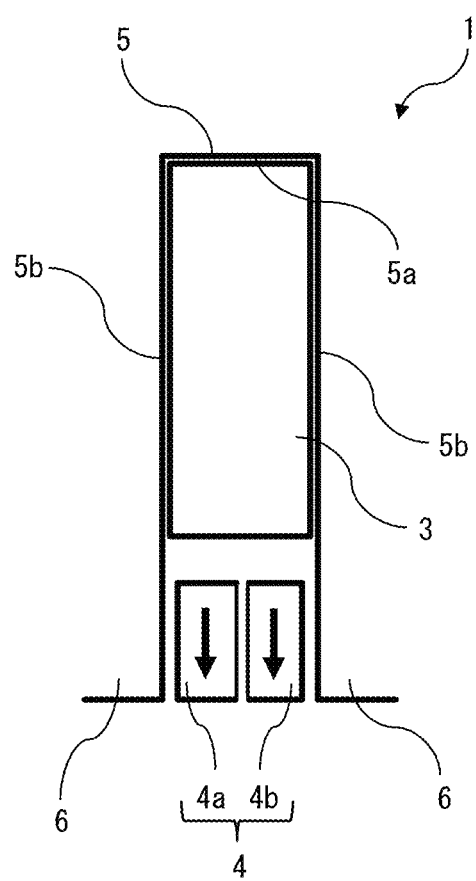
FIG. 7 is a schematic diagram showing a cross-section of a stator slot of a rotary electric machine according to Embodiment 2.

A stator 1 according to Embodiment 2 will be described. FIG. 7 is a schematic diagram showing a cross-section of a stator slot 5 of a rotary electric machine 100. The stator 1 according to Embodiment 2 has a configuration in which wall surfaces 5b of the stator slot 5 and a stator magnet 4 are disposed so as to be spaced apart from each other.

The stator slot 5 includes a stator coil 3 and the stator magnet 4 which is divided at the center in the circumferential direction of the stator slot 5. A stator magnet 4a and a stator magnet 4b obtained as a result of the division are spaced apart from the opposed two wall surfaces 5b of the stator slot 5, respectively. There may be an air layer between the stator magnet 4 and the stator slot 5, but the stator magnet 4 and the stator slot 5 may be in contact with each other with a non-magnetic member interposed therebetween. Each of the stator magnet 4a and the stator magnet 4b is fixed, for example, so as to be adhered to the wall surface 5b of the stator slot 5 with a non-magnetic resin member (not shown) interposed therebetween, but the fixing method therefor is not limited thereto. A fixing member may be provided between each of the stator magnet 4a and the stator magnet 4b and the stator coil 3, and each of the stator magnet 4a and the stator magnet 4b may be fixed so as to be adhered to the fixing member.

Figure 8:
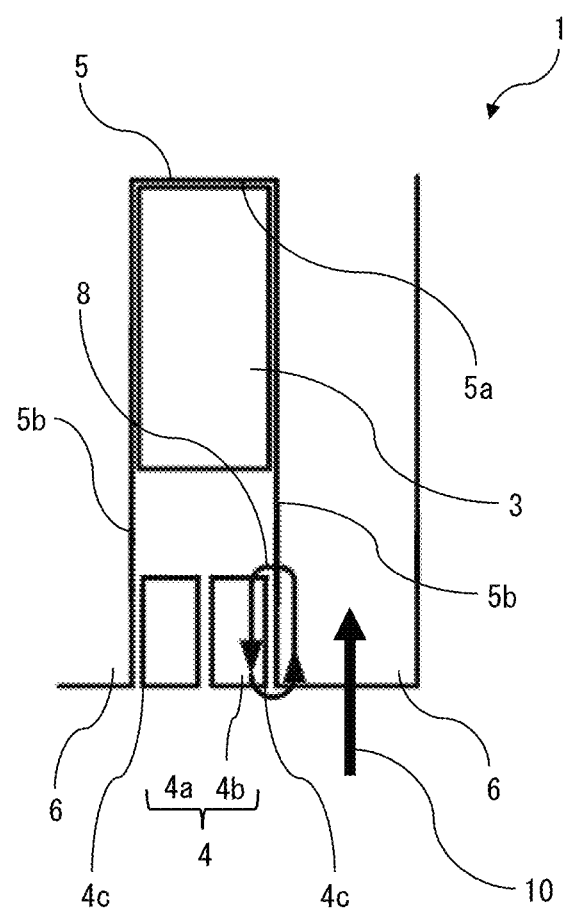
FIG. 8 is a schematic diagram illustrating a magnetic flux around a stator magnet of the rotary electric machine according to Embodiment 2.

The reason why the stator magnet 4 is disposed so as to be spaced apart from the wall surfaces 5b will be described. FIG. 8 is a schematic diagram illustrating a magnetic flux 8 around the stator magnet 4 of the rotary electric machine 100 according to Embodiment 2. FIG. 8 is a diagram in which the magnetic flux 8 caused by the stator magnet 4 is added to FIG. 7. The magnetic flux 8 is a leakage magnetic flux. When the direction of the leakage magnetic flux is the same as that of a main magnetic flux 10 caused by the low-speed rotor 20 and the high-speed rotor 30, an excessive magnetic flux interlinks with a stator tooth 6, resulting in magnetic saturation at the stator tooth 6. When the main magnetic flux 10 is decreased by the magnetic saturation, the main magnetic flux 10 that interlinks with the stator coil 3 is decreased, so that the output of the stator 1 is decreased. When the stator magnet 4 is disposed so as to be spaced apart from the wall surfaces 5b, the leakage magnetic flux is reduced, and the magnetic saturation at each stator tooth 6 is suppressed. When the magnetic saturation is suppressed, a decrease in the output of the stator 1 is avoided.

On the opening side of the stator slot 5, a corner portion 4c on each stator tooth 6 side of the stator magnet 4 is a portion at which irreversible demagnetization is easily caused by the main magnetic flux 10. This is because the magnetization direction of the stator magnet 4 and the direction of the main magnetic flux 10 are opposite to each other. When the stator magnet 4 is disposed so as to be spaced apart from the wall surfaces 5b, the irreversible demagnetization occurring at the corner portion 4c can be suppressed.

As described above, in the stator 1 according to Embodiment 2, since the stator magnet 4 is disposed so as to be spaced apart from the wall surfaces 5b, the magnetic saturation at each stator tooth 6 can be suppressed. Since the magnetic saturation is suppressed, a decrease in the output of the stator 1 is avoided. In addition, since the stator magnet 4 is disposed so as to be spaced apart from the wall surfaces 5b, the irreversible demagnetization occurring at the corner portion 4c on each stator tooth 6 side of the stator magnet 4 can be suppressed.

Embodiment 3

Figure 9:
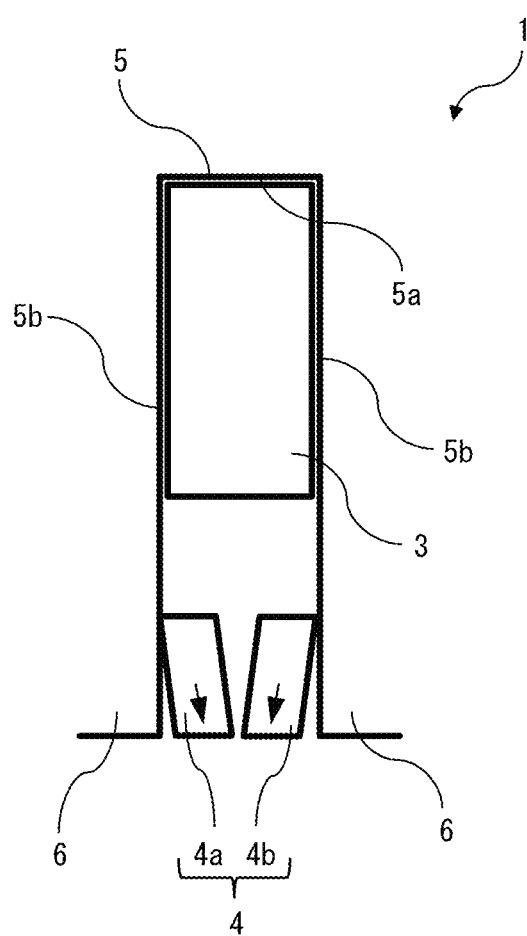
FIG. 9 is a schematic diagram showing a cross-section of a stator slot of a rotary electric machine according to Embodiment 3.

A stator 1 according to Embodiment 3 will be described. FIG. 9 is a schematic diagram showing a cross-section of a stator slot 5 of a rotary electric machine 100. The stator 1 according to Embodiment 3 has a configuration in which a stator magnet 4a and a stator magnet 4b are disposed so as to be inclined.

The stator slot 5 includes a stator coil 3 and a stator magnet 4 which is divided at the center in the circumferential direction of the stator slot 5. The stator magnet 4a and the stator magnet 4b obtained as a result of the division are disposed so as to be inclined such that the interval between the stator magnet 4a and the stator magnet 4b decreases toward the center in the circumferential direction of the stator slot 5 on the opening side of the stator slot 5. Each of the stator magnet 4a and the stator magnet 4b is magnetized in a direction parallel to that of the inclination thereof. For example, the direction of each arrow shown in FIG. 9 is the magnetization direction.

Magnetic fluxes generated by the stator magnet 4a and the stator magnet 4b extend in the directions in which the stator magnet 4a and the stator magnet 4b are magnetized, so that the direction of each arrow shown in FIG. 9 is the direction of the magnetic flux. Therefore, the magnetic fluxes generated by the stator magnet 4a and the stator magnet 4b are concentrated at the center on the opening side of the stator slot 5. Due to the concentration of the magnetic fluxes, the peak value of the magnetic flux caused by the stator magnet 4 rises, so that the output of the stator 1 is increased. In addition, since the stator magnet 4a and the stator magnet 4b are disposed so as to be inclined, the distances between the stator magnet 4a and 4b and stator teeth 6 are larger on the opening side of the stator slot 5. Therefore, the leakage magnetic fluxes caused by the stator magnet 4a and the stator magnet 4b and extending from the stator magnet 4a and the stator magnet 4b toward the stator teeth 6 are reduced.

As described above, in the stator 1 according to Embodiment 3, since the stator magnet 4a and the stator magnet 4b are disposed so as to be inclined, the peak value of the magnetic flux caused by the stator magnet 4 rises, so that the output of the stator 1 can be increased. In addition, since the distances between the stator magnet 4a and the stator magnet 4b and the stator teeth 6 are larger, the leakage magnetic fluxes caused by the stator magnet 4a and the stator magnet 4b and extending toward the stator teeth 6 are reduced, so that the magnetic saturation at the stator teeth 6 can be suppressed.

Embodiment 4

Figure 10:
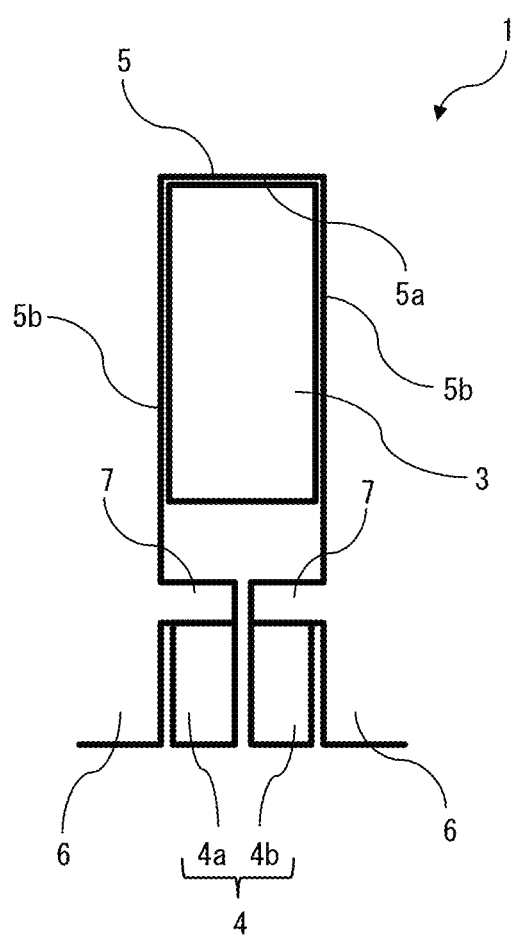
FIG. 10 is a schematic diagram showing a cross-section of a stator slot of a rotary electric machine according to Embodiment 4.

A stator 1 according to Embodiment 4 will be described. FIG. 10 is a schematic diagram showing a cross-section of a stator slot 5 of a rotary electric machine 100. The stator 1 according to Embodiment 4 has a configuration in which magnetic chip portions 7 are provided between a stator coil 3 and a stator magnet 4.

The stator slot 5 includes the stator coil 3, the stator magnet 4 which is divided at the center in the circumferential direction of the stator slot 5, and the magnetic chip portions 7. The magnetic chip portions 7 are provided on opposed two wall surfaces 5b of the stator slot 5 between the stator coil 3 and the stator magnet 4 so as to be spaced apart from each other. Each magnetic chip portion 7 is in contact with the stator magnet 4. The magnetic chip portions 7 are spaced apart from each other at the center in the circumferential direction of the stator slot 5.

Since the magnetic chip portions 7 are provided, the magnetic flux caused by the stator magnet 4 extends from stator teeth 6 through the magnetic chip portions 7 toward the stator magnet 4. The magnetic flux is concentrated on the magnetic chip portions 7 and passes near the stator magnet 4, so that the magnetic force of the stator magnet 4 is improved. Since the magnetic force of the stator magnet 4 is improved, a high-output stator 1 is obtained.

As described above, in the stator 1 according to Embodiment 4, since the magnetic chip portions 7 are provided between the stator coil 3 and the stator magnet 4 so as to be in contact with the stator magnet 4, the magnetic force of the stator magnet 4 is improved, so that the output of the stator 1 can be improved.

Embodiment 5

Figure 11:
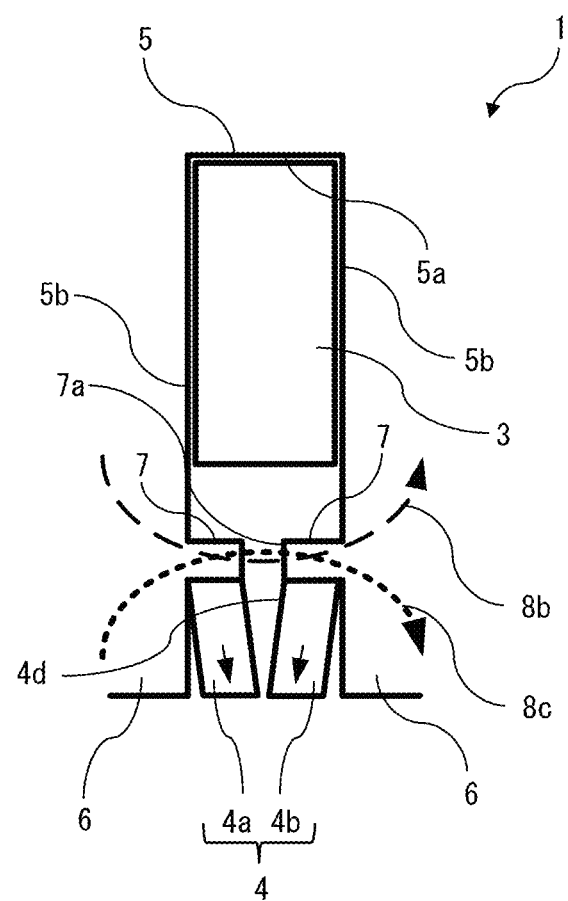
FIG. 11 is a schematic diagram showing a cross-section of a stator slot of a rotary electric machine according to Embodiment 5.

A stator 1 according to Embodiment 5 will be described. FIG. 11 is a schematic diagram showing a cross-section of a stator slot 5 of a rotary electric machine 100. The stator 1 according to Embodiment 5 has a configuration in which magnetic chip portions 7 are provided between a stator coil 3 and a stator magnet 4 which is disposed so as to be inclined.

The stator slot 5 includes the stator coil 3, the stator magnet 4 which is divided at the center in the circumferential direction of the stator slot 5, and the magnetic chip portions 7. A stator magnet 4a and a stator magnet 4b obtained as a result of the division are disposed so as to be inclined such that the interval between the stator magnet 4a and the stator magnet 4b decreases toward the center in the circumferential direction of the stator slot 5 on the opening side of the stator slot 5. The magnetic chip portions 7 are provided on opposed two wall surfaces 5b of the stator slot 5 between the stator coil 3 and the stator magnet 4 so as to be spaced apart from each other. The magnetic chip portions 7 are each in contact with the stator magnet 4, and are spaced apart from each other at the center in the circumferential direction of the stator slot 5. Opposed surfaces 7a of the magnetic chip portions 7 and opposed surfaces 4d of the stator magnet 4a and the stator magnet 4b are connected to each other.

In the case where the magnetic chip portions 7 are provided so as to be in contact with the stator magnet 4, not only the magnetic flux caused by the stator magnet 4 but also a magnetic flux 8b caused by the stator coil 3 and a magnetic flux 8c caused by each rotor pass through the magnetic chip portions 7 as shown in FIG. 11. The magnetic fluxes 8b and 8c are leakage magnetic fluxes. If a leakage magnetic flux increases, the performance of the stator 1 deteriorates. Since the magnetic chip portions 7 are spaced apart from each other, the leakage magnetic flux drawn into the magnetic chip portions 7 is reduced. Since the magnetic chip portions 7 in the present embodiment are provided so as to be connected to the opposed surfaces 4d of the stator magnet 4 which is provided so as to be inclined, the interval between the magnetic chip portions 7 is larger. Since the interval between the magnetic chip portions 7 is larger, the leakage magnetic flux is further reduced. In addition, since the surfaces 7a and the surfaces 4d are connected to each other, the magnetic force of the stator magnet 4 is efficiently improved.

The degree to which the opposed magnetic chip portions 7 are spaced apart from each other is not limited thereto, and, for example, in the case where a reduction in the leakage magnetic flux is prioritized, the opposed magnetic chip portions 7 may be further spaced apart from each other such that each magnetic chip portion 7 is in contact with a part of the stator magnet 4 on the stator coil 3 side.

As described above, in the stator 1 according to Embodiment 5, since the magnetic chip portions 7 are provided so as to be in contact with the stator magnet 4 which is provided so as to be inclined, the interval between the magnetic chip portions 7 is larger, and the leakage magnetic flux is further reduced, so that the deterioration of the performance of the stator 1 can be suppressed. In addition, in the case where the surfaces 7a and the surfaces 4d are connected to each other, the magnetic force of the stator magnet 4 can be efficiently improved.

Embodiment 6

Figure 12:
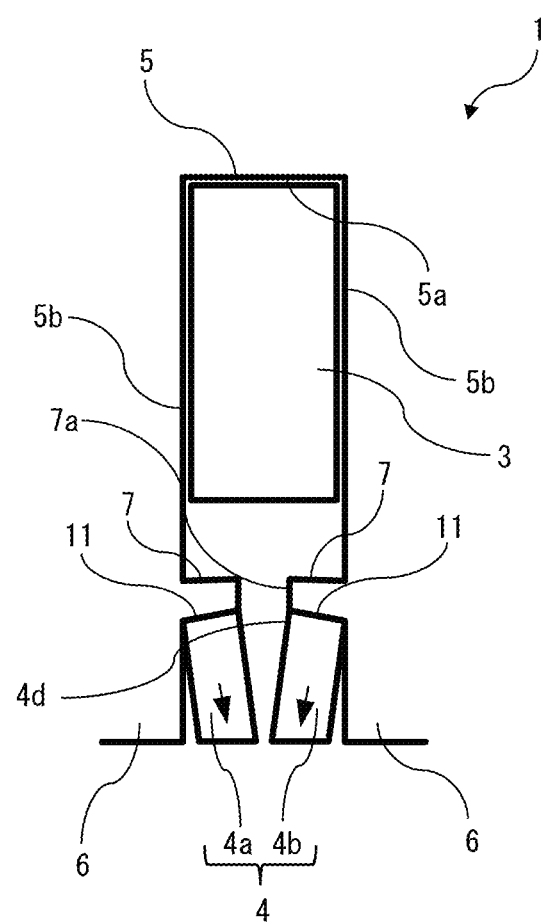
FIG. 12 is a schematic diagram showing a cross-section of a stator slot of a rotary electric machine according to Embodiment 6.

A stator 1 according to Embodiment 6 will be described. FIG. 12 is a schematic diagram showing a cross-section of a stator slot 5 of a rotary electric machine 100. The stator 1 according to Embodiment 6 has a configuration in which contact surfaces 11 at which magnetic chip portions 7 and a stator magnet 4 are in contact with each other are inclined.

The stator slot 5 includes a stator coil 3, the stator magnet 4 which is divided at the center in the circumferential direction of the stator slot 5, and the magnetic chip portions 7. The magnetic chip portions 7 are respectively provided on opposed wall surfaces 5b of the stator slot 5 between the stator coil 3 and the stator magnet 4 so as to be spaced apart from each other. The magnetic chip portions 7 are each in contact with the stator magnet 4, and are spaced apart from each other at the center in the circumferential direction of the stator slot 5. The contact surfaces 11 at which the magnetic chip portions 7 and the stator magnet 4 are in contact with each other are inclined relative to the opening of the stator slot 5 such that the contact surfaces 11 are closer to the stator coil 3 on the side where there are the opposed surfaces 7a of the magnetic chip portions 7.

Figure 13:
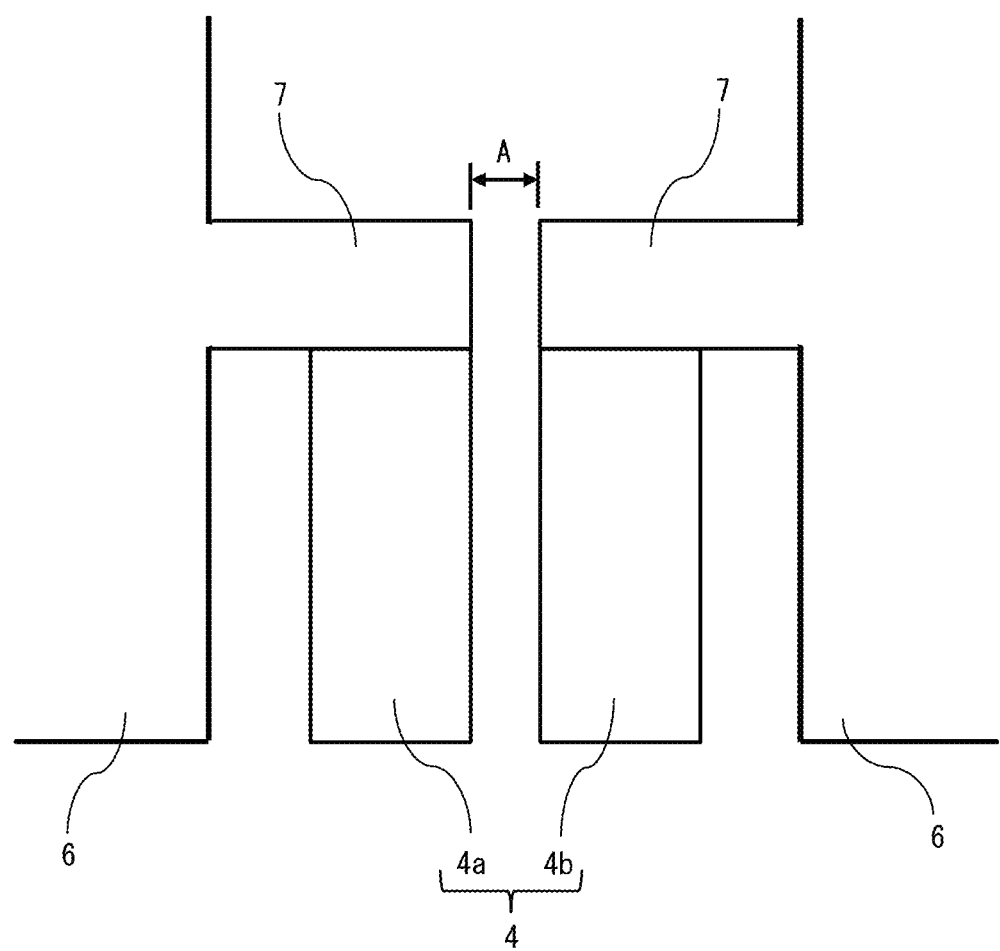
FIG. 13 is a diagram illustrating the interval between opposed magnetic chips.
Figure 14:
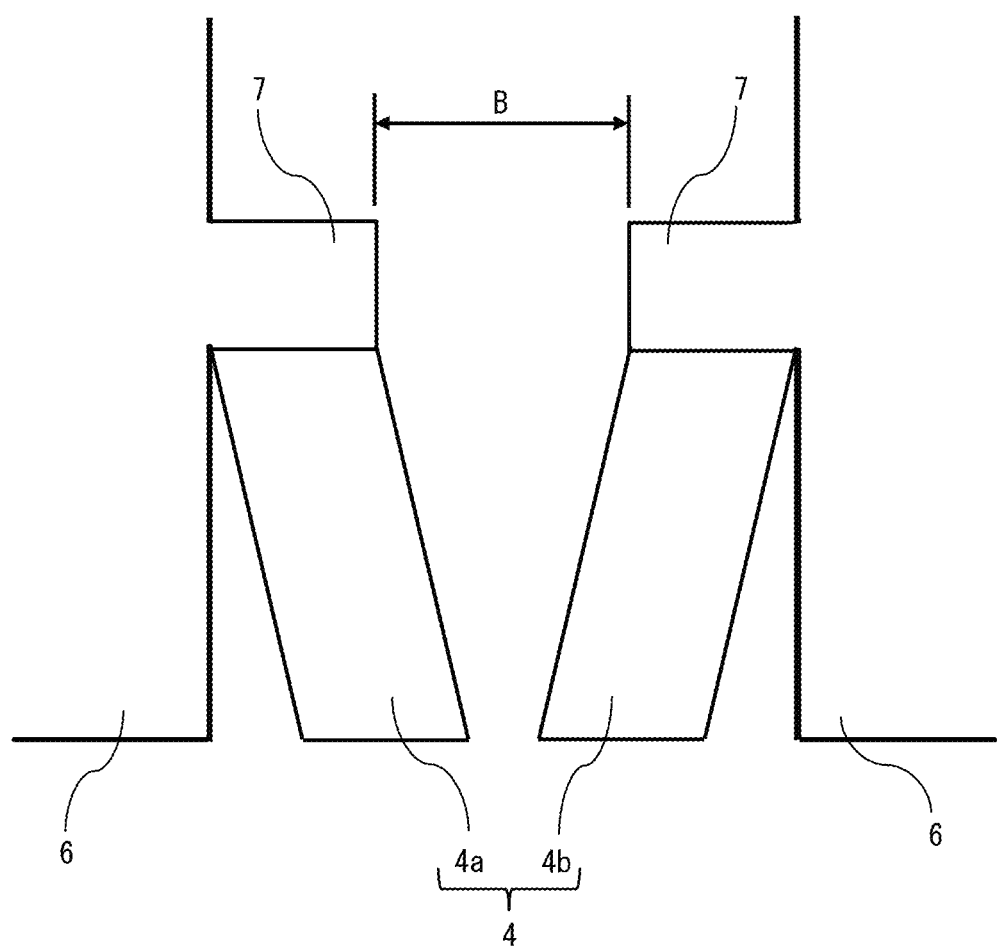
FIG. 14 is a diagram illustrating the interval between opposed magnetic chips.
Figure 15:
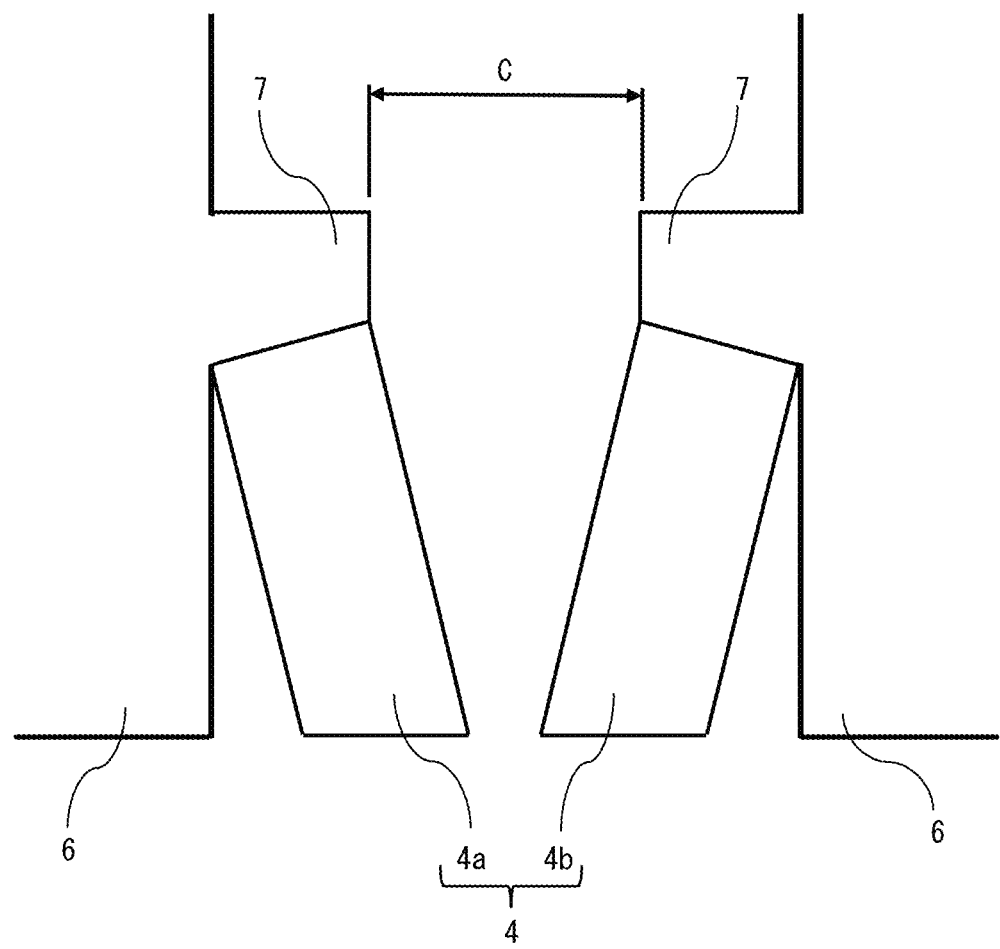
FIG. 15 is a diagram illustrating the interval between opposed magnetic chips.

FIG. 13 to FIG. 15 are each a diagram illustrating the interval between the opposed magnetic chip portions 7. FIG. 13 is a diagram showing the interval between the magnetic chip portions 7 shown in FIG. 10 (Embodiment 4), and an interval A is the interval between the magnetic chip portions 7. FIG. 14 is a diagram showing the interval between the magnetic chip portions 7 shown in FIG. 11 (Embodiment 5), and an interval B is the interval between the magnetic chip portions 7. FIG. 15 is a diagram showing the interval between the magnetic chip portions 7 shown in FIG. 12, and an interval C is the interval between the magnetic chip portions 7. The interval B is larger than the interval A, and the interval C is larger than the interval B. The volume of the stator magnet 4 is the same in all the embodiments. From the comparison between FIG. 14 and FIG. 15, it is found that by inclining the contact surfaces 11 without changing the volume of the stator magnet 4 and the magnetic flux density of the stator magnet 4, the interval between the magnetic chip portions 7 is further increased. Since the interval between the magnetic chip portions 7 is further increased, the leakage magnetic flux is further reduced. In addition, in FIG. 12, since the surfaces 7a and the surfaces 4d are connected to each other, the magnetic force of the stator magnet 4 is efficiently improved.

As described above, in the stator 1 according to Embodiment 6, since the contact surfaces 11 at which the magnetic chip portions 7 and the stator magnet 4 are in contact with each other are inclined, the interval between the magnetic chip portions 7 can be increased without changing the volume of the stator magnet 4. Since the interval between the magnetic chip portions 7 is increased, the leakage magnetic flux is reduced, so that the deterioration of the performance of the stator 1 can be suppressed.

Embodiment 7

Figure 16:
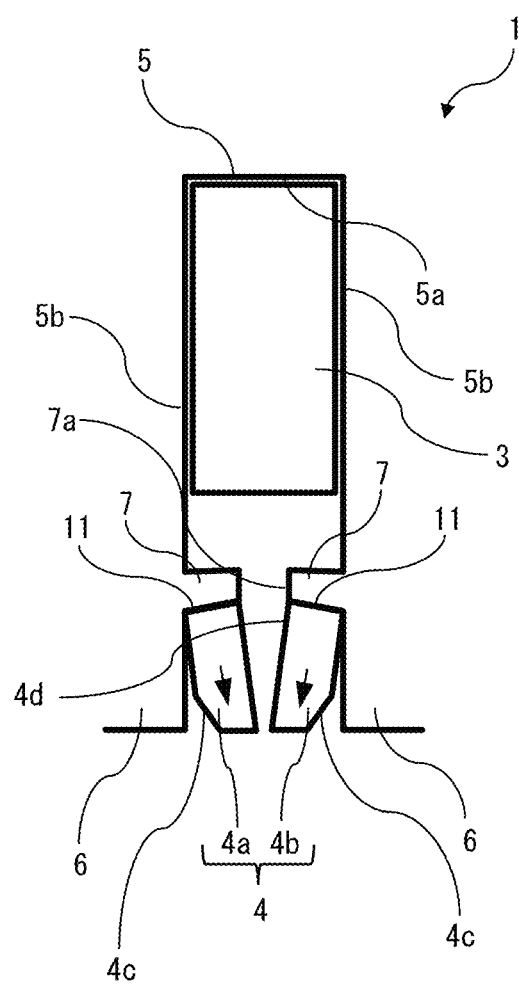
FIG. 16 is a schematic diagram showing a cross-section of a stator slot of a rotary electric machine according to Embodiment 7.

A stator 1 according to Embodiment 7 will be described. FIG. 16 is a schematic diagram showing a cross-section of a stator slot 5 of a rotary electric machine 100. The stator 1 according to Embodiment 7 has a configuration in which a corner portion 4c on each stator tooth 6 side of a stator magnet 4 is chamfered.

The stator slot 5 includes a stator coil 3, the stator magnet 4 which is divided at the center in the circumferential direction of the stator slot 5, and magnetic chip portions 7. The magnetic chip portions 7 are provided on opposed two wall surfaces 5b of the stator slot 5 between the stator coil 3 and the stator magnet 4 so as to be spaced apart from each other. The magnetic chip portions 7 are each in contact with the stator magnet 4, and are spaced apart from each other at the center in the circumferential direction of the stator slot 5. The corner portion 4c, on the opening side of the stator slot 5 and on each stator tooth 6 side, of the stator magnet 4 is chamfered.

Figure 17:
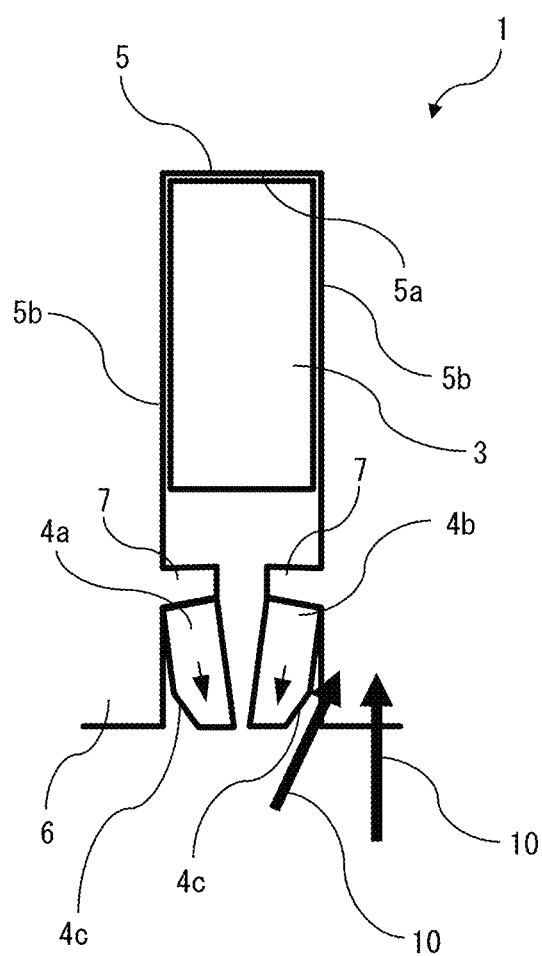
FIG. 17 is a schematic diagram illustrating a magnetic flux around a stator magnet of the rotary electric machine according to Embodiment 7.

The reason why the corner portion 4c is chamfered will be described. FIG. 17 is a schematic diagram illustrating a magnetic flux around the stator magnet 4 of the rotary electric machine 100 according to Embodiment 7. FIG. 17 is a diagram in which an example of a main magnetic flux 10 caused by a low-speed rotor and a high-speed rotor (not shown in FIG. 17) is added to FIG. 16. The corner portion 4c, on the opening side of the stator slot 5 and on each stator tooth 6 side, of the stator magnet 4 is a portion at which irreversible demagnetization is easily caused by the main magnetic flux 10. This is because the direction in which the stator magnet 4 is magnetized and the direction of the main magnetic flux 10 are opposite to each other. Since the corner portion 4c of the stator magnet 4 is chamfered, the irreversible demagnetization occurring at the corner portion 4c can be suppressed.

As described above, in the stator 1 according to Embodiment 7, since the corner portion 4c on each stator tooth 6 side of the stator magnet 4 is chamfered, the irreversible demagnetization occurring at the corner portion 4c can be suppressed. In addition, since the stator magnet 4 is partially spaced apart from wall surfaces 5b when the corner portions 4c are chamfered, the magnetic saturation at the stator teeth 6 can be suppressed.

Embodiment 8

Figure 18:
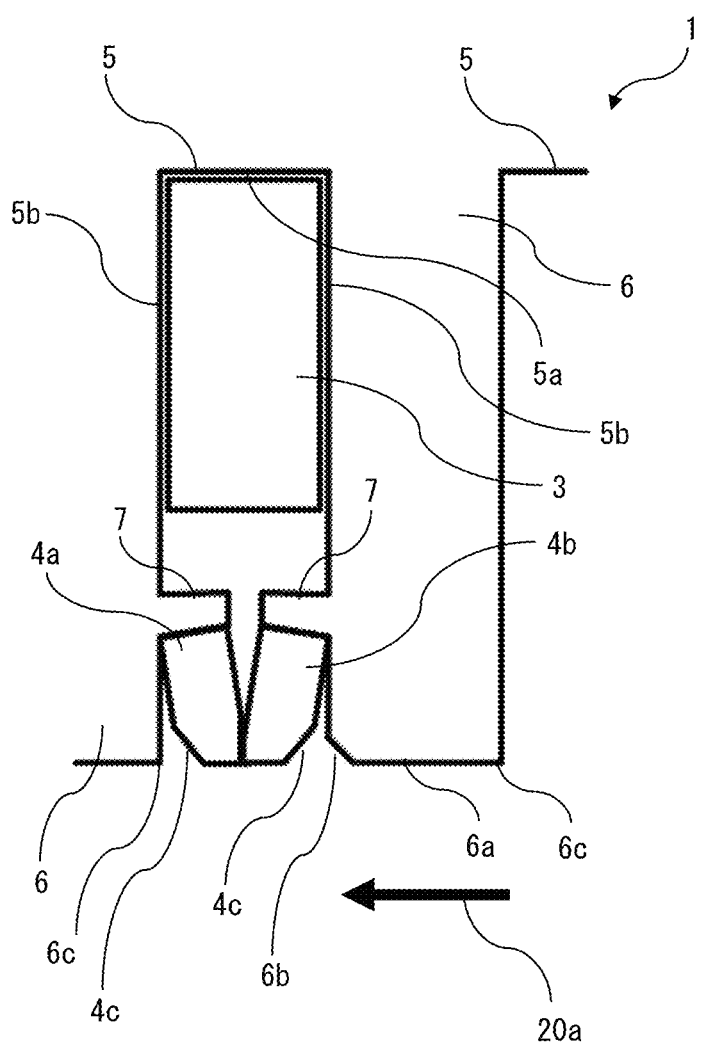
FIG. 18 is a schematic diagram showing a cross-section of a stator slot of a rotary electric machine according to Embodiment 8.

A stator 1 according to Embodiment 8 will be described. FIG. 18 is a schematic diagram showing a cross-section of a stator slot 5 of a rotary electric machine 100. The stator 1 according to Embodiment 8 has a configuration in which a corner portion 6b of an end surface 6a of a stator tooth 6 is chamfered.

The stator slot 5 includes a stator coil 3, a stator magnet 4 which is divided at the center in the circumferential direction of the stator slot 5, and magnetic chip portions 7. The magnetic chip portions 7 are respectively provided on opposed wall surfaces 5b of the stator slot 5 between the stator coil 3 and the stator magnet 4 so as to be spaced apart from each other. The magnetic chip portions 7 are each in contact with the stator magnet 4, and are spaced apart from each other at the center in the circumferential direction of the stator slot 5. Either one of opposed corner portions 6b and 6c, on the opening side of the stator slot 5, of two stator teeth 6 is chamfered. Here, the corner portion 6b on the stator magnet 4b side of the end surface 6a is chamfered.

The reason why the corner portion 6b or 6c to be chamfered is selected will be described. An arrow shown in FIG. 18 is a rotation direction 20a of a low-speed rotor (not shown) provided on the inner circumferential side of the stator 1. In the case where the stator 1 is provided in a generator, the corner portion 6b on the advancement side in the rotation direction 20a is cut. In the case where the stator 1 is provided in an electric motor, the corner portion 6c on the delay side in the rotation direction 20a is cut. FIG. 18 shows the case where the stator 1 is provided in a generator, and thus the corner portion 6b is cut.

The reason why the corner portion 6b or the corner portion 6c is chamfered will be described. Through studies, it is found that as for the magnetic flux density of each stator tooth 6, the magnetic saturation becomes significant on the advancement side in the rotation direction 20a of the rotor in the case of a generator, and the magnetic saturation becomes significant on the delay side in the rotation direction of the rotor in the case of an electric motor. Due to the magnetic saturation, the stator magnet 4 is easily demagnetized at the corner portion on the delay side of the stator magnet 4 in the case of a generator, and at the corner portion on the advancement side of the stator magnet 4 in the case of an electric motor. By cutting the corner portion of the stator tooth 6 on the side on which the magnetic saturation becomes significant, the demagnetization occurring at the corner portion of the stator magnet 4 due to the magnetic flux from the rotor can be reduced.

As described above, in the stator 1 according to Embodiment 8, since the corner portion 6b or the corner portion 6c of the stator tooth 6 is chamfered, the demagnetization occurring at the corner portion 4c of the stator magnet 4 due to the magnetic flux from the rotor can be reduced. Since the demagnetization of the stator magnet 4 is reduced, the magnetic force of the stator magnet 4 is improved, and the output of the stator 1 can be improved.

Embodiment 9

Figure 19:
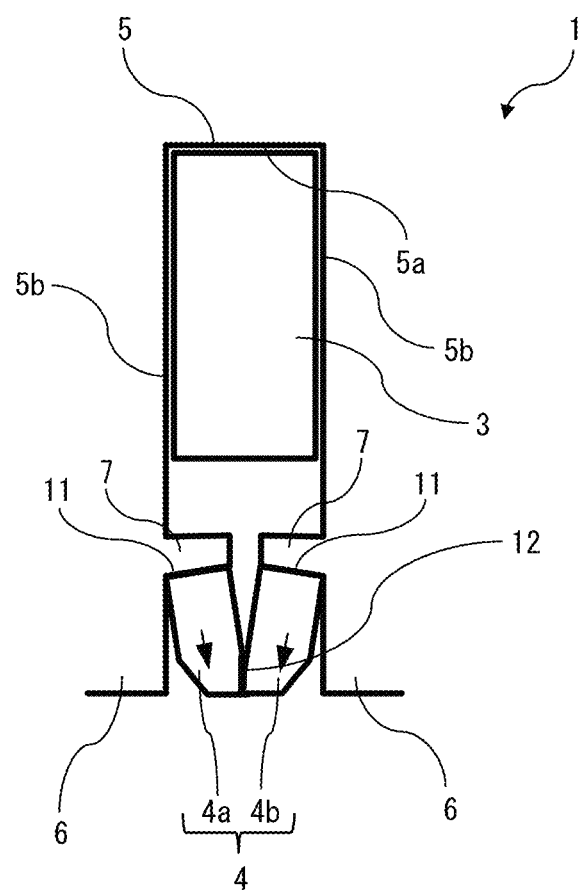
FIG. 19 is a schematic diagram showing a cross-section of a stator slot of a rotary electric machine according to Embodiment 9.

A stator 1 according to Embodiment 9 will be described. FIG. 19 is a schematic diagram showing a cross-section of a stator slot 5 of a rotary electric machine 100. The stator 1 according to Embodiment 9 has a configuration in which parts of a stator magnet 4a and a stator magnet 4b are connected to each other via a non-magnetic member on the opening side of the stator slot 5.

The stator slot 5 includes a stator coil 3, a stator magnet 4 which is divided at the center in the circumferential direction of the stator slot 5, and magnetic chip portions 7. The magnetic chip portions 7 are provided on opposed two wall surfaces 5b of the stator slot 5 between the stator coil 3 and the stator magnet 4 so as to be spaced apart from each other. The magnetic chip portions 7 are each in contact with the stator magnet 4, and are spaced apart from each other at the center in the circumferential direction of the stator slot 5. The stator magnet 4a and the stator magnet 4b are fixed to the magnetic chip portions 7 at contact surfaces 11, respectively. Furthermore, opposed portions, on the opening side of the stator slot 5, of the stator magnet 4a and the stator magnet 4b are connected to each other via an adhesive 12 which is a non-magnetic member. The non-magnetic member is not limited to the adhesive 12, and the opposed portions may be connected to each other by covering the opposed portions with a resin, for example.

As described above, in the stator 1 according to Embodiment 9, since the opposed portions, on the opening side of the stator slot 5, of the stator magnet 4a and the stator magnet 4b are connected to each other, the stator magnet 4a and the stator magnet 4b can be stably fixed in the stator slot 5. In addition, a stator 1 and a rotary electric machine 100 having improved reliability in terms of mechanical strength can be obtained. Moreover, since the stator magnet 4a and the stator magnet 4b are close to each other on the opening side of the stator slot 5, the peak value of the magnetic flux caused by the stator magnet 4 rises, so that the output of the stator 1 can be increased.

Embodiment 10

Figure 20:
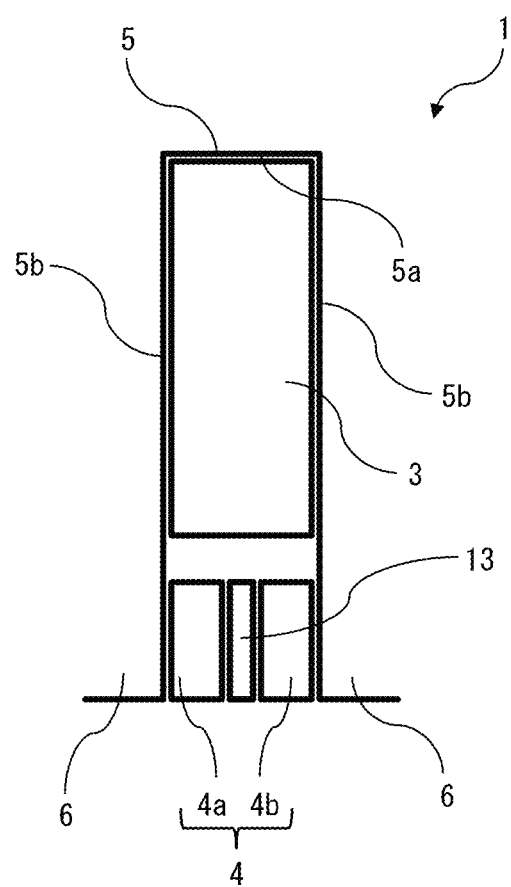
FIG. 20 is a schematic diagram showing a cross-section of a stator slot of a rotary electric machine according to Embodiment 10.

A stator 1 according to Embodiment 10 will be described. FIG. 20 is a schematic diagram showing a cross-section of a stator slot 5 of a rotary electric machine 100. The stator 1 according to Embodiment 10 has a configuration in which a cooling portion is provided between a stator magnet 4a and a stator magnet 4b.

The stator slot 5 includes a stator coil 3 and a stator magnet 4. The stator magnet 4 is divided into the stator magnet 4a and the stator magnet 4b at the center in the circumferential direction of the stator slot 5. The cooling portion is provided at a location where the stator magnet 4a and the stator magnet 4b are opposed to each other. The cooling portion is, for example, a tube through which fluid flows, and is a vent tube 13. The vent tube 13 is passed between the stator magnet 4a and the stator magnet 4b in an axial direction perpendicular to the drawing sheet of FIG. 20. The stator magnet 4 is cooled by a cooling oil or cooling water flowing through the vent tube 13. The cooling portion is not limited to the vent tube 13, and may be a ventilation passage through which cooling air flows.

As described above, in the stator 1 according to Embodiment 10, since the vent tube 13 which is the cooling portion is provided between the stator magnet 4a and the stator magnet 4b, the magnetic force of the stator magnet 4 is improved to improve the performance of the stator 1 by cooling the stator magnet 4, so that the output of the rotary electric machine 100 can be improved.

Embodiment 11

Figure 21:
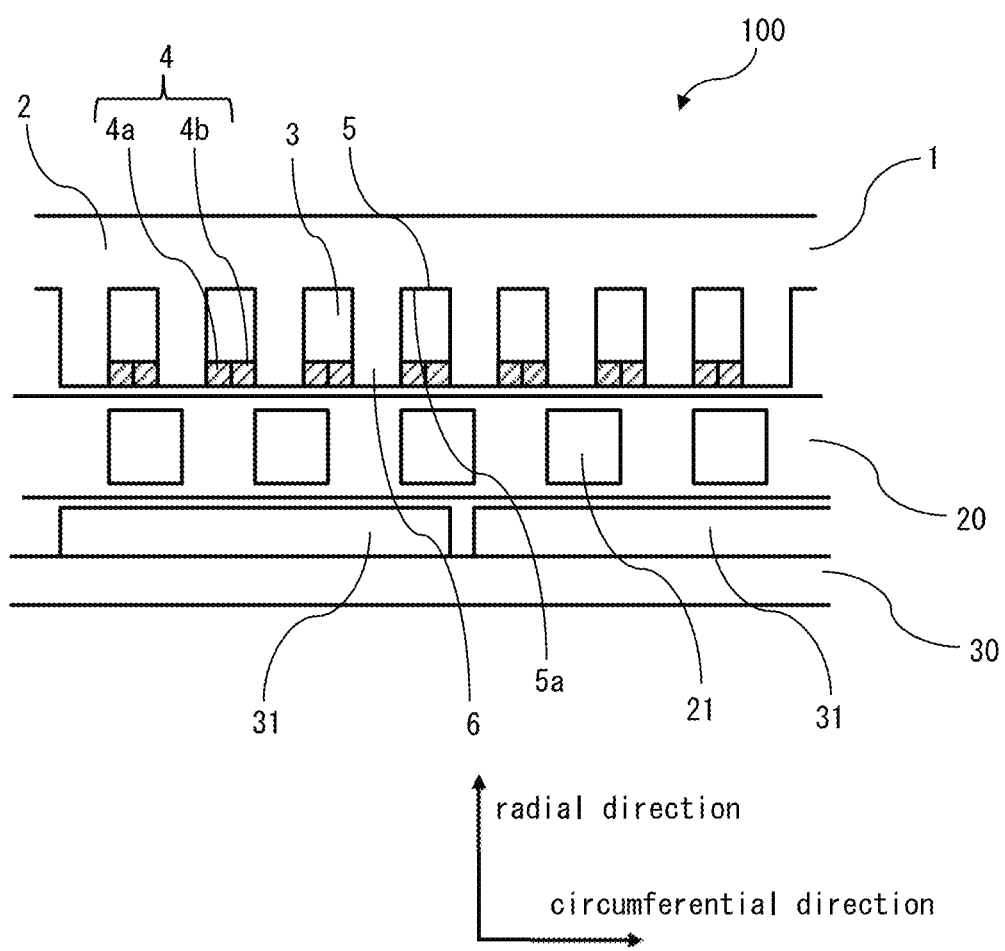
FIG. 21 is a schematic diagram showing a major part of a rotary electric machine according to Embodiment 11.

In Embodiment 11, a rotary electric machine 100 in which the stator 1 described in Embodiment 1 is used will be described. FIG. 21 is a schematic diagram showing a major part of the rotary electric machine 100. The rotary electric machine 100 according to Embodiment 11 has a configuration in which, in each stator slot 5, a stator magnet 4 divided at the center in the circumferential direction of the stator slot 5 is provided.

As shown in FIG. 21, the rotary electric machine 100 includes: an annular stator 1 which surrounds a rotary shaft (not shown) which is at the center of rotation of the rotary electric machine 100; a low-speed rotor 20 which is a first rotor having a plurality of magnetic pole pieces 21 and provided coaxially with the stator 1 so as to be opposed to the stator magnets 4; and a high-speed rotor 30 which is a second rotor having high-speed rotor magnets 31, which are a plurality of permanent magnets, and provided coaxially with the low-speed rotor 20 so as to be opposed to the low-speed rotor 20. The stator 1 includes a stator core 2, a stator coil 3, and the stator magnets 4. The annular stator core 2 includes a plurality of stator teeth 6 provided at equal intervals in the circumferential direction with respect to the center of rotation of the rotary electric machine 100. Each stator slot 5 is formed between the stator teeth 6. Each stator magnet 4 is divided into a stator magnet 4a and a stator magnet 4b at the center in the circumferential direction of the stator slot 5.

As described above, in the rotary electric machine 100 according to Embodiment 11, since each stator magnet 4 is divided at the center in the circumferential direction of the stator slot 5, the eddy current 9 is reduced, so that the eddy current loss in the stator magnet 4 can be suppressed. In addition, since each stator magnet 4 is divided at the center in the circumferential direction, a decrease in the magnetic force of the stator magnet 4 due to the division can be suppressed. Moreover, since the eddy current 9 is reduced, thermal demagnetization of the stator magnet 4 can be suppressed. Moreover, since the eddy current loss and thermal demagnetization of the stator magnet 4 are suppressed, the deterioration of the performance of the stator 1 can be suppressed, the output of the rotary electric machine 100 is maintained, and the reliability of the rotary electric machine 100 can be improved.

Although the rotary electric machine 100 in which the stator 1 described in Embodiment 1 is used has been described above, also in each of rotary electric machines 100 in which the stators 1 described in Embodiment 2 to Embodiment 10 are used, the output of the rotary electric machine 100 is maintained by suppressing eddy current loss and thermal demagnetization of each stator magnet 4, so that the reliability of the rotary electric machine 100 can be improved. In addition, the same effects are achieved in a generator or a motor including a stator 1 having the same configuration as in the present disclosure. Moreover, although the rotary electric machines 100 in each of which the stator 1 is located at the outermost circumference have been described above, the placement of the stator 1 is not limited to the outermost circumference, and an outer rotor type rotary electric machine in which the stator 1 is located at the innermost circumference may be adopted. In the case where the stator 1 is provided at the innermost circumference, the stator core includes a plurality of stator slots which are arranged in the circumferential direction and are open toward the outer circumferential side of the rotary electric machine.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 stator
2 stator core
3 stator coil
4 stator magnet
4a stator magnet
4b stator magnet
4c corner portion
4d surface
5 stator slot
5a bottom portion
5b wall surface
6 stator teeth
6a end surface
6b corner portion
6c corner portion
7 magnetic chip portion
8 magnetic flux
9 eddy current
10 main magnetic flux
11 contact surface
12 adhesive
13 vent tube
20 low-speed rotor
20a rotation direction
21 magnetic pole piece
30 high-speed rotor
31 high-speed rotor magnet
40 rotary shaft
100 rotary electric machine

The invention claimed is:

1. A stator comprising:
a stator core including a plurality of stator teeth in a circumferential direction with respect to a center of rotation of a rotary electric machine;
a stator coil disposed on a bottom portion side of each of a plurality of stator slots formed between the stator teeth; and
a stator magnet disposed on an opening side of each of the plurality of stator slots and having the same polarity in a radial direction, wherein
in each of the stator slots, the stator magnet is divided at a center in the circumferential direction of the stator slot along the polarity, and
the stator comprises magnetic chip portions provided on opposed two wall surfaces of the stator slat between the stator coil and the stator magnet so as to be spaced apart from each other and be each in contact with the stator mulct.

2. The stator according to claim 1, wherein the opposed two wall surfaces of the stator slot and the stator magnet are spaced apart from each other.

3. The stator according to claim 1, wherein
the two stator magnets obtained as a result of the division are disposed so as to be inclined such that an interval between the two stator magnets decreases toward the center in the circumferential direction of the stator slot at the opening, and
the two stator magnets are each magnetized in a direction parallel to the inclination thereof.

4. The stator according to claim 1, wherein contact surfaces at which the magnetic chip portions and the stator magnet are in contact with each other are inclined relative to the opening so as to be closer to the stator coil on a side where there are opposed surfaces of the magnetic chip portions.

5. The stator according to claim 1, wherein a corner portion, on the opening side and on each stator tooth side, of the stator magnet is chamfered.

6. The stator according to claim 1, wherein either one of opposed corner portions, on the opening side of the stator slot, of the two stator teeth is chamfered.

7. The stator according to claim 1, further comprising a cooling portion at a location where the two stator magnets obtained as a result of the division are opposed to each other.

8. A rotary electric machine comprising:
   the stator according to claim 1;
   a first rotor having a plurality of magnetic pole pieces and provided coaxially with the stator so as to be opposed to the stator magnets; and
   a second rotor having a plurality of permanent magnets and provided coaxially with the first rotor so as to be opposed to the first rotor.

* * * * *